United States Patent [19]

Vollebregt

[11] Patent Number: 5,265,373
[45] Date of Patent: Nov. 30, 1993

[54] CURTAIN SYSTEM

[75] Inventor: Richard Vollebregt, Brantford, Canada

[73] Assignee: Cravo Equipment Ltd., Ontario, Canada

[21] Appl. No.: 642,281

[22] Filed: Jan. 15, 1991

[51] Int. Cl.⁵ .................. A01G 13/00; A01G 9/00
[52] U.S. Cl. ............................ 47/17; 47/26; 160/84.1 R
[58] Field of Search ............ 47/17; 160/84.1, DIG. 7, 160/5, 7

[56] References Cited

U.S. PATENT DOCUMENTS

| 912,849 | 2/1909 | Hultgreen | 160/84.1 |
|---|---|---|---|
| 3,236,290 | 2/1966 | Laeder | 160/DIG. 7 |
| 3,375,321 | 3/1968 | Laing . | |
| 3,481,073 | 12/1969 | Yoshida et al. | 47/17 |
| 3,593,772 | 7/1971 | Abraham | 160/84.1 |
| 3,946,789 | 3/1976 | Tölle | 160/84.1 |
| 4,481,998 | 11/1984 | Strandberg et al. | 160/344 |
| 4,565,230 | 1/1986 | Rijn | 160/84.1 |
| 4,583,517 | 4/1986 | Hilton et al. | 126/135 |
| 4,813,198 | 3/1989 | Johnston | 160/DIG. 7 |
| 4,884,612 | 5/1989 | Schnebly | 160/84.1 |

OTHER PUBLICATIONS

Brochure entitled "Cravo environmental Control Curtain Systems".
Brochure entitled "Cravo Exterior Systems".

Primary Examiner—Henry E. Raduazo
Attorney, Agent, or Firm—Baker & Daniels

[57] ABSTRACT

A curtain system includes two portions of a curtain each mounted on a common guide. Each portion is dimensioned to cover a predetermined area so that the portions may be deployed alternatively. One of the portions is selectively engageable with a drive cable to allow deployment of one or the other portion by the cable.

14 Claims, 10 Drawing Sheets

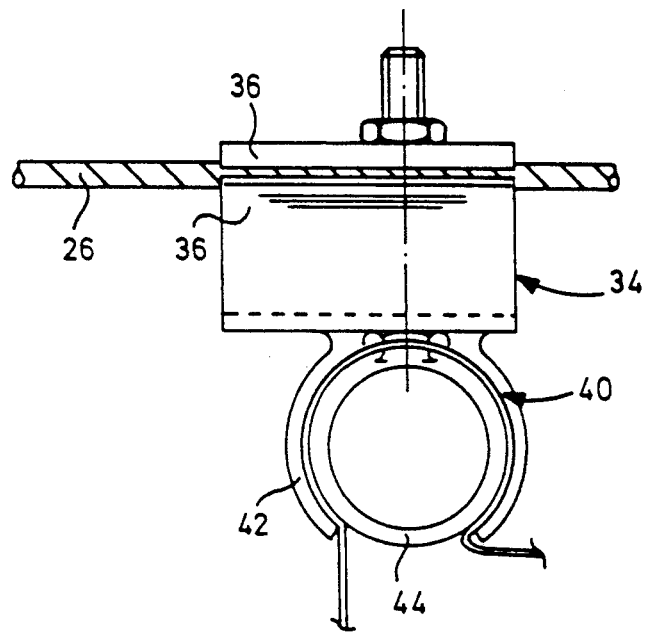
FIG. 6
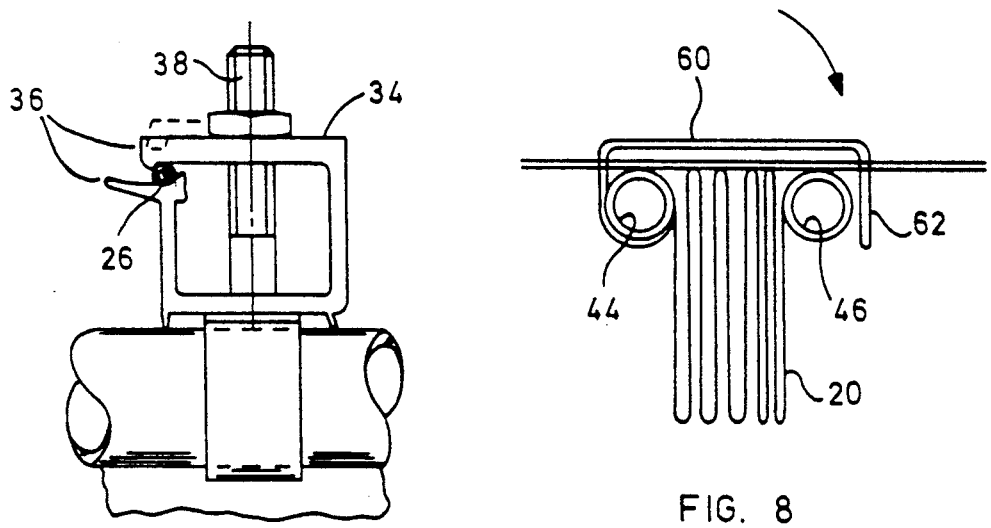
FIG. 7
FIG. 8
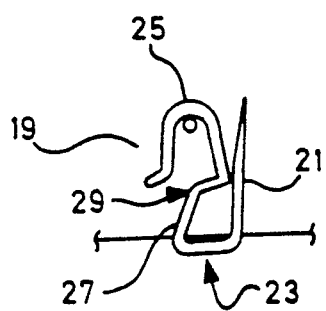
FIG. 5a
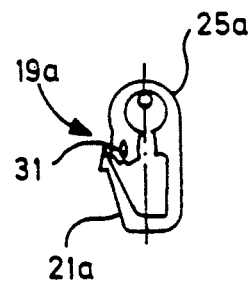
FIG. 5b

CURTAIN SYSTEM

The invention relates to curtain systems. Curtain systems have been used for a number of years in horticultural and agricultural applications to produce a localized environment and avoid crop damage. Curtain systems may be used within greenhouses, outside of greenhouses, or as stand-alone units depending upon the nature of the particular application. In some instances, the curtain systems will provide protection against frost and in other instances will protect against excessive heat by providing shade. Similarly, curtains can be used to produce an artificial environment such as a complete lack of light to trigger the growing cycle of the crop.

In general, curtain systems utilize a support structure that allows the curtain to be moved between retracted and deployed configurations. Depending upon the particular application, the material of the curtain will vary to provide the necessary type of protection. Certain materials are essentially an open weave net that reduces the amount of light transmitted and so provides shade during periods of peak sunlight. Likewise, the material used for frost protection acts as a thermal insulator and inhibits movement of warm air from the vicinity of the crop.

In certain locations and depending upon the crop being grown, it is necessary to provide protection for a number of different conditions. Thus, in certain conditions, it may be necessary to provide protection against frost and protection against excessive sunlight. This has been provided in the past by utilizing a pair of curtain systems, one above the other, that may be deployed alternatively. While this arrangement is satisfactory, it is relatively expensive as supports and drive systems for each curtain system have to be provided. Moreover, the installation of the drive system is somewhat complicated due to the location of one system above the other.

The expense associated with plural systems can be justified where each of the conditions is predictable and frequent. However, in certain applications, certain conditions are not predictable or always present in a growing cycle, such as, for example, the onset of frost within the Florida citrus crop, and for these applications the expense of providing an extra curtain system for protection which may only be used occasionally.

It is therefore an object of the present invention to provide a curtain system in which the above disadvantages are obviated or mitigated.

According to the present invention, there is provided a curtain system to extend between a pair of spaced locations and cover a predetermined area, said system having guide means extending between said locations, a curtain having first and second portions, each having an area equal to or greater than the predetermined area and each supported on the guide means for movement along a common path and drive means operable to move said portions on said guide means, said drive means being operable selectively on said portions to move one or other of said portions between a retracted configuration and a deployed configuration.

Preferably said drive means include attachment means to attach each of said portions to said drive means for movement therewith, at least one of the attachment means being selectively operable to disconnect one of said portions from the drive means and allow operation of the drive means to move the other portion between said configurations without changing the configuration of the one portion on said guide means.

By providing two portions of different characteristics on a common guide, it is possible to deploy one or other of the portions of the curtain as required. In this way, the expense of the additional drive and support systems associated with double systems is avoided and it is simply necessary to provide a curtain with the portions exhibiting the appropriate characteristics to provide the necessary protection.

Embodiments of the invention will now be described by way of example only with reference to the accompanying drawings, in which FIG. 1 is a perspective representation of a portion of a curtain system with the curtain in the fully retracted position;

Figure 1:
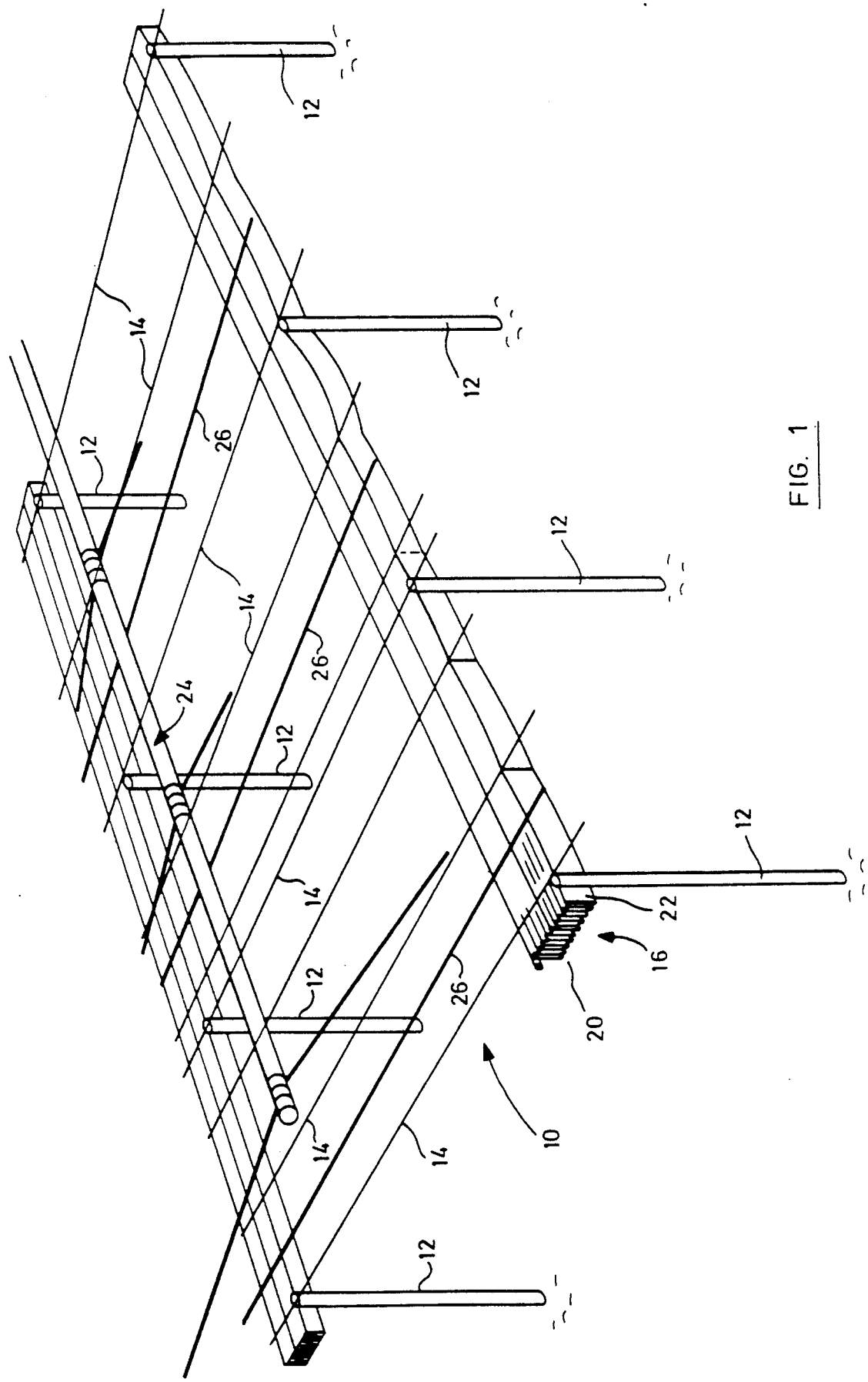
Figure 5:
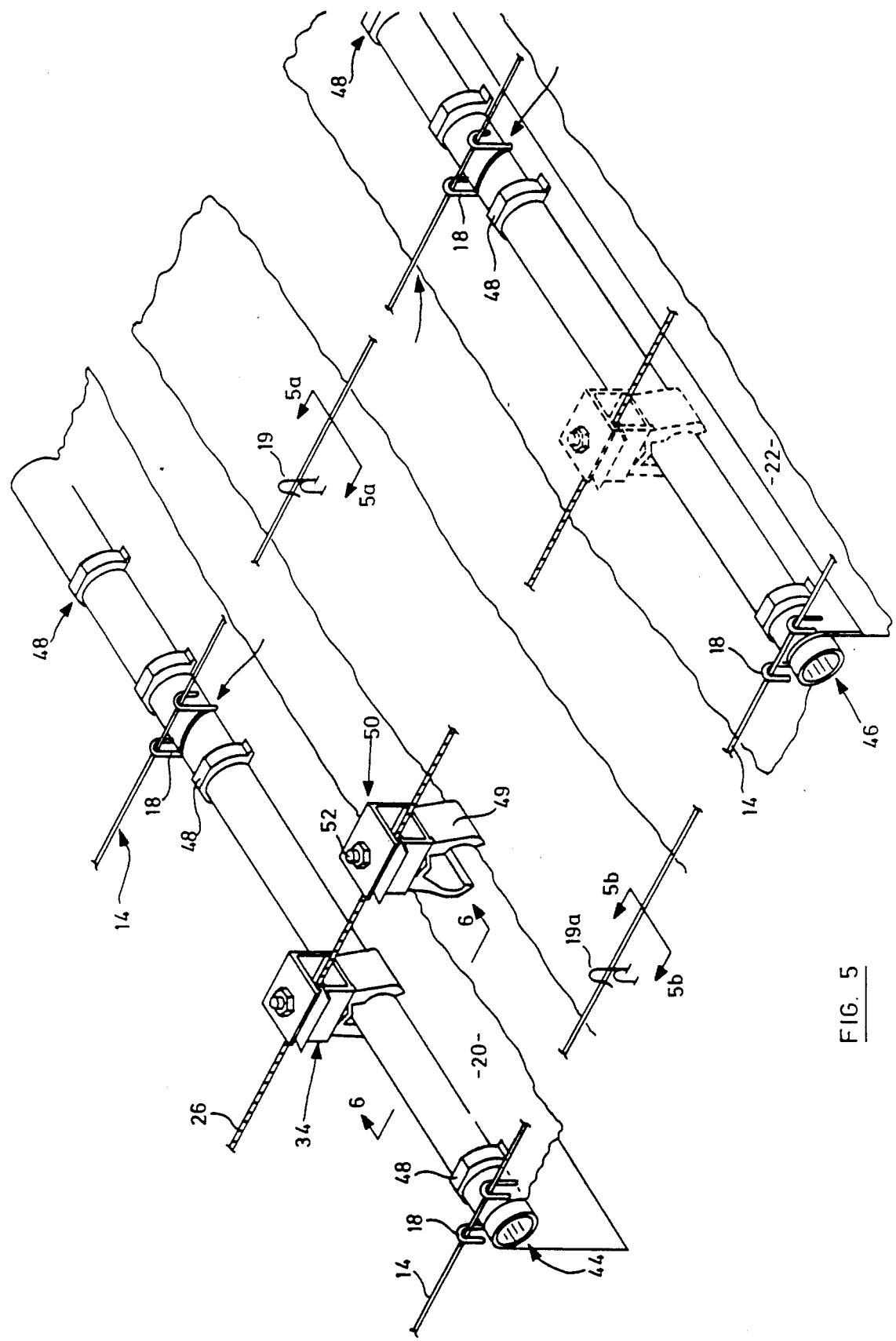
FIG. 5 is an enlarged view of a portion of the curtain system shown in FIG. 4.
Figure 9:
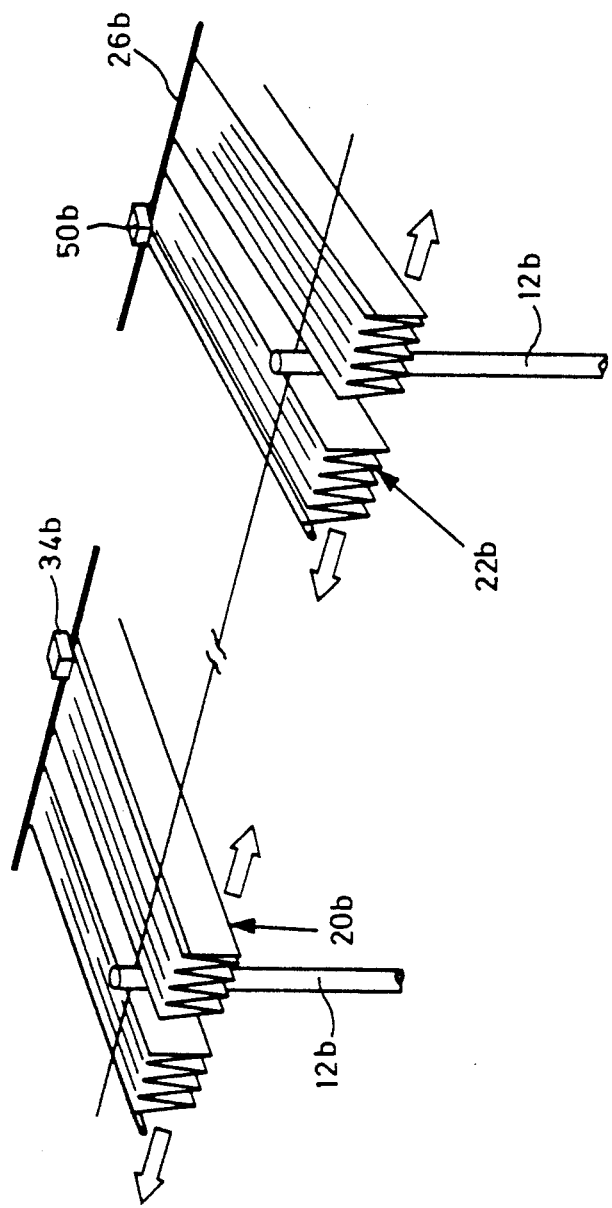
Figure 10:
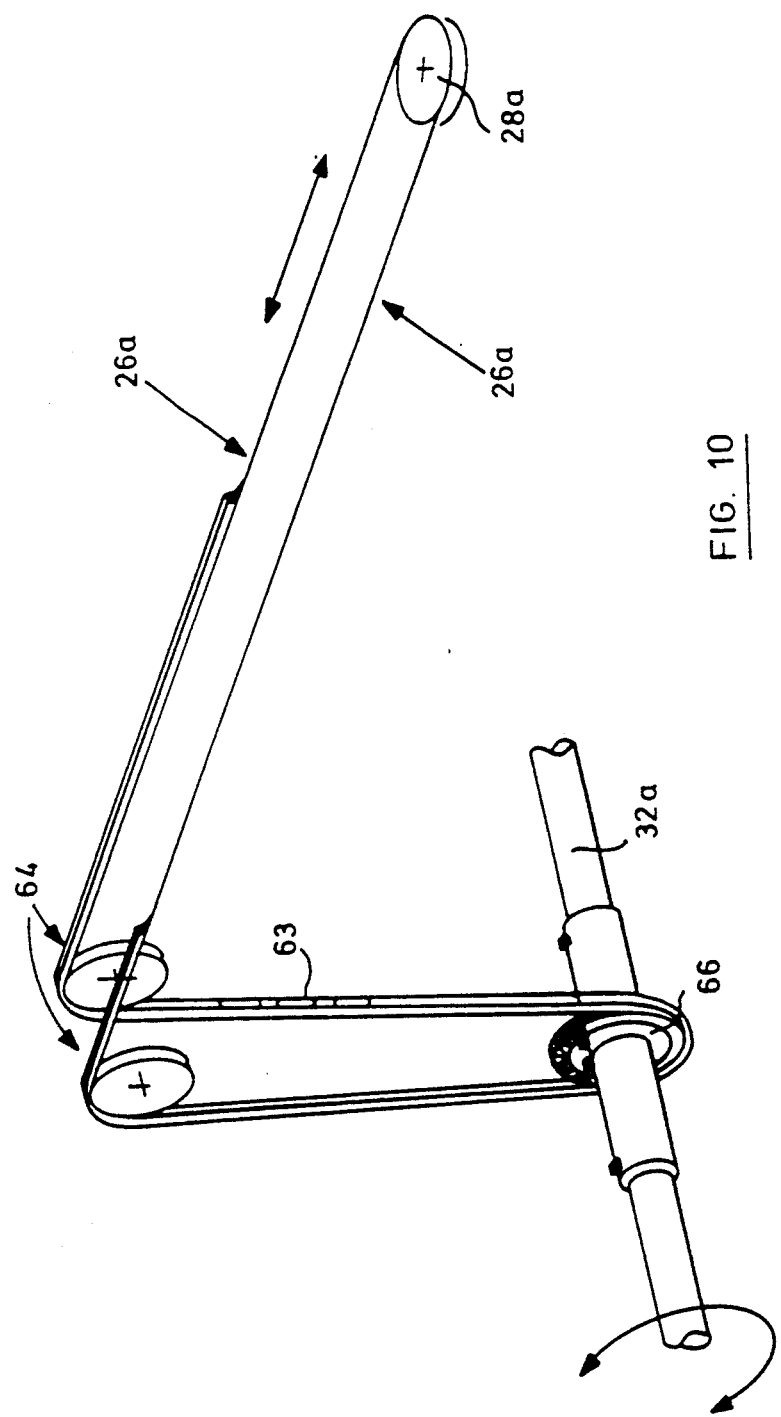
Figure 11:
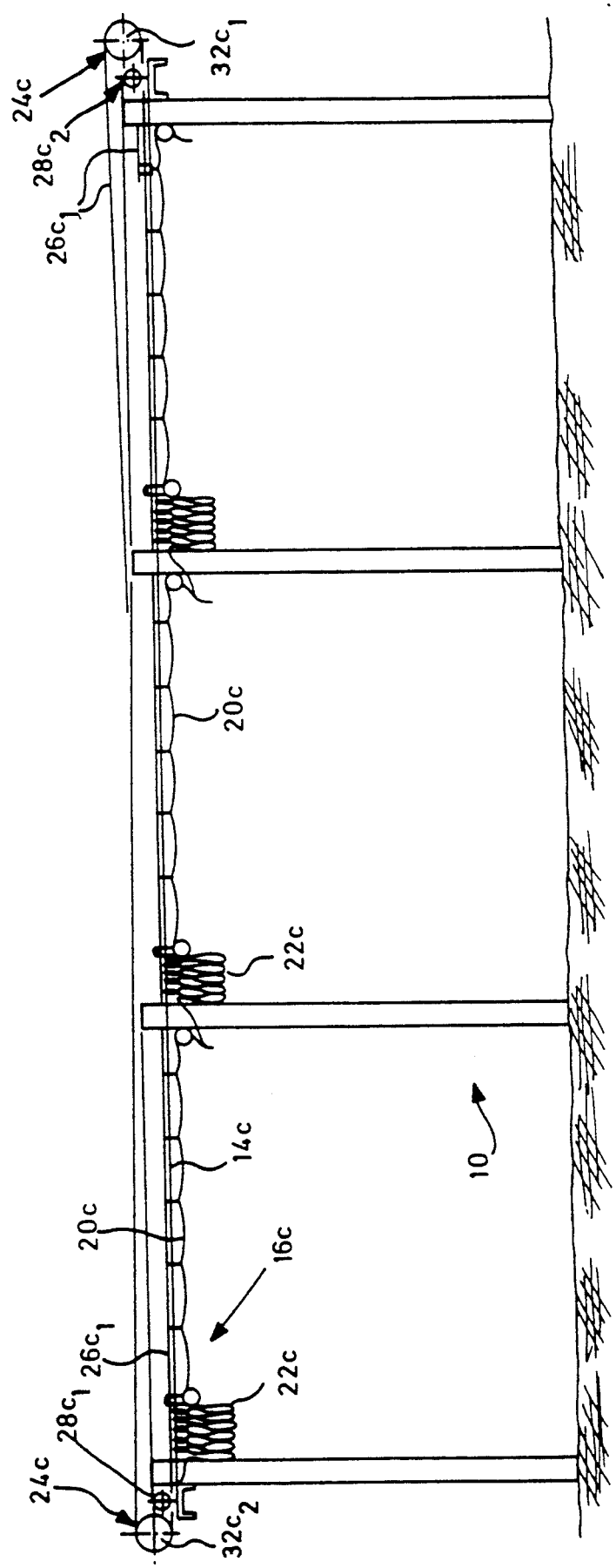

FIGS. 5a and 5b are views of FIG. 5 taken on the lines 5a and 5b respectively;

FIG. 6 is a section on the line 6—6 of FIG. 5;

FIG. 7 is an end view of FIG. 6;

FIG. 8 is an end view of an alternative arrangement of a portion of the curtain system shown in FIG. 1;

FIG. 9 is a view similar to FIG. 1 showing an alternative arrangement of curtain system;

FIG. 10 is a schematic representation of an alternative view of the drive system for use with the curtain systems of FIGS. 1 or 9;

FIG. 11 is a representation of a further arrangement of curtain system; and

Figure 12:
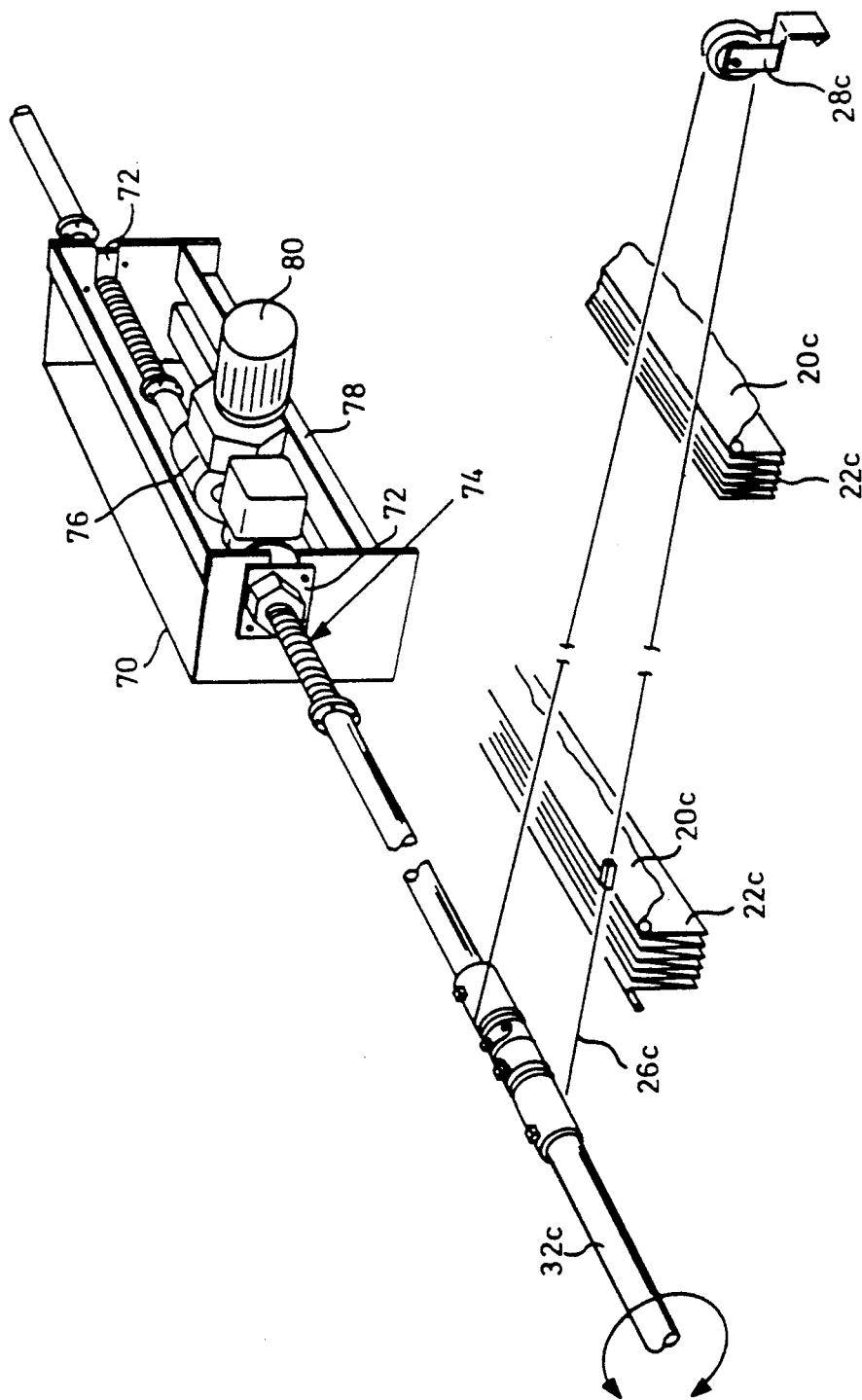

FIG. 12 is a perspective view of a portion of the embodiment shown in FIG. 11.

Referring therefore to FIG. 1, a curtain system generally indicated at 10 includes vertical posts 12 arranged in laterally spaced aligned rows. It will be appreciated that the curtain system shown in FIG. 1 is intended for external use either independent of or over the top of glass houses and therefore utilizes posts 12 as supports. Moreover, the system will include several rows of posts 12, each of similar configuration to that shown in FIG. 1 to cover an extended area.

Extending between the rows of posts 12 are guidewires 14 that are tensioned to inhibit sagging between the posts 12. Between each pair of posts 12, a curtain 16 is supported by the guidewires 14 at spaced intervals so as to form vertical folds when in a retracted configuration as shown in FIG. 1. The leading edge of curtain 16 is attached to the guidewires 14 by wire loops 18 as shown in FIG. 5 so that the loops 18 are free to slide along the guidewires 14 in a conventional manner. As shown more fully in FIG. 5a, the curtain 16 is supported from the wires 14 at spaced intervals by hooks 19 which include a tang 21 to pierce the material at laterally spaced locations and a platform 23 to support the material. The hook 19 has an inverted bight portion 25 extending from a neck 27 with a barb 29 projection toward the bight portion 25. Hooks 19 therefore permit easy attachment to the wire 14 in a manner that allows sliding movement along the wire 14 with the barb 29 inhibiting accidental removal of the hook 19.

The lateral edges of the curtain 20 are similarly connected to the guide wires 14 by hooks 19a shown in FIG. 5b but in this case the tangs 21a are formed on the same side as the bight portion 25a and are engageable with a notch 31 in the bight portion to secure the guide wire 14.

Figure 2:
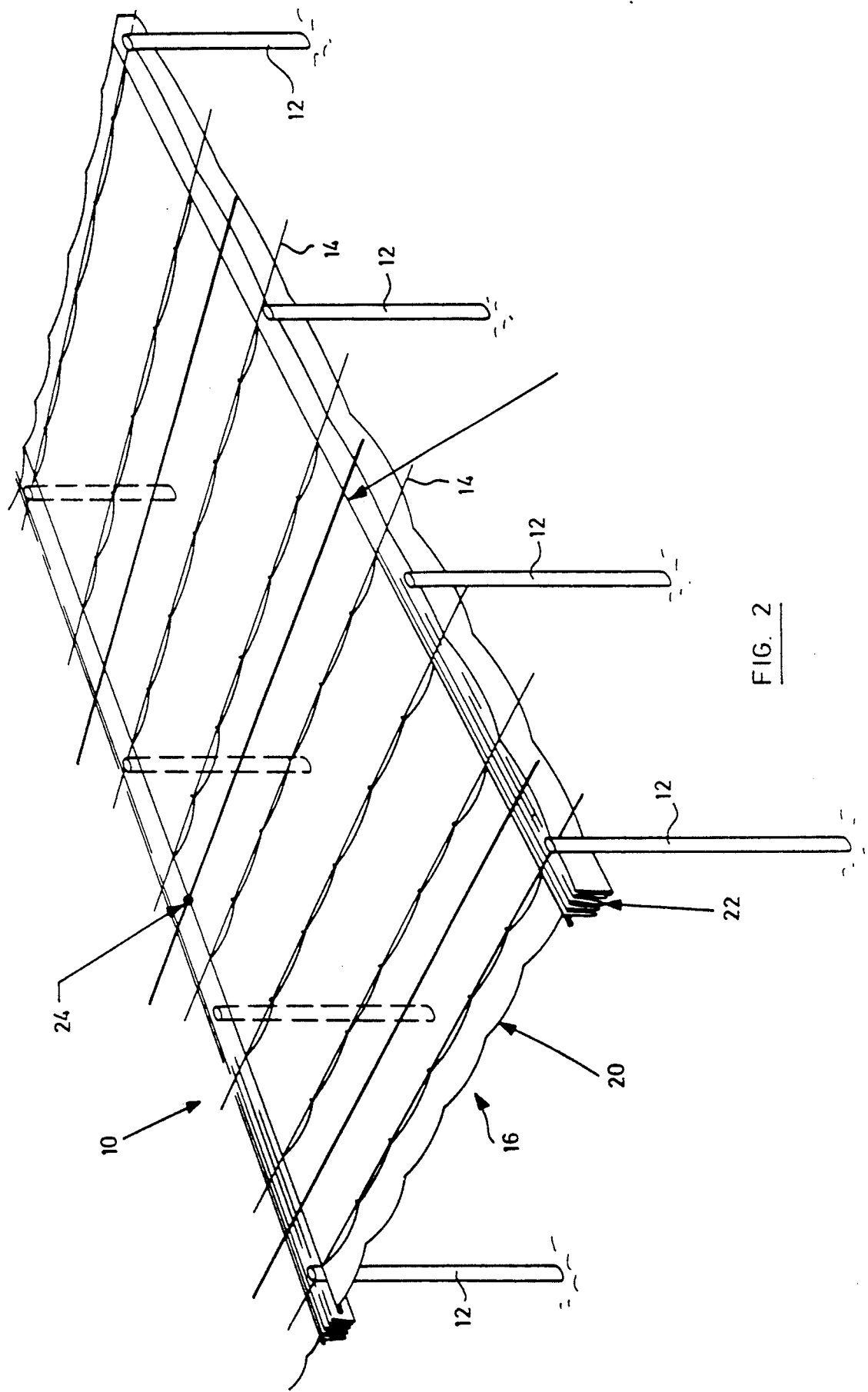
FIG. 2 is a view of the curtain system of FIG. 1 showing one portion of the curtain deployed.
Figure 3:
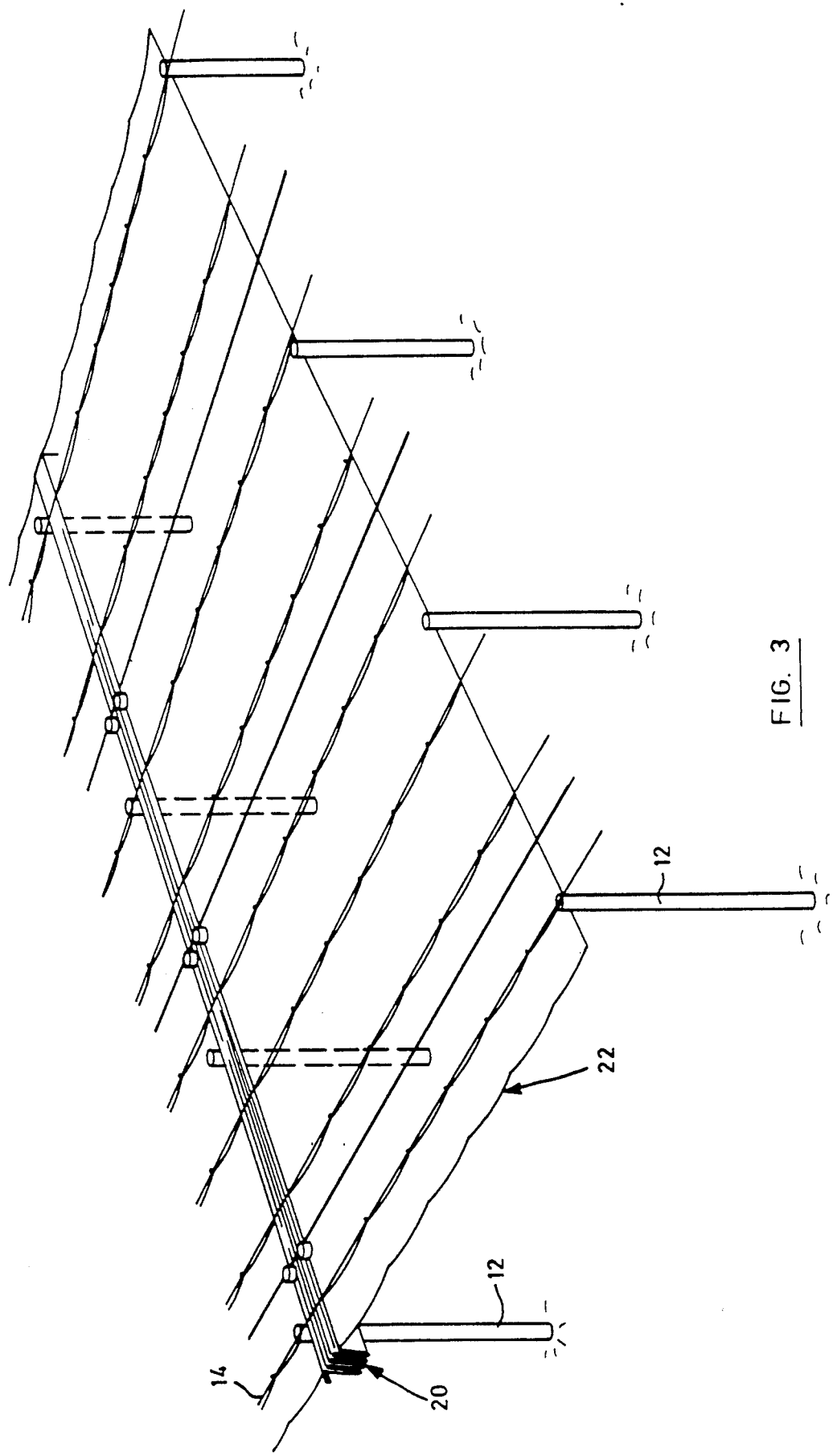
FIG. 3 is a view of the curtain system of FIG. 1 showing the other portion of the curtain deployed.

The curtain 16 is formed from two portions 20,22 which are made of dissimilar material. Each of the portions 20,22 is dimensioned to extend between the adjacent rows of posts 12 to cover the area between the rows of posts 12 when deployed as shown in FIGS. 2 and 3 respectively. In the example shown in FIGS. 1 through 3, the leading portion 20 is formed from a shading material such as Weathershade from V. J. Growers and the trailing portion 22 is formed from a frost-protection material such as PAK 86 from PAK.

The curtain 16 is deployed and retracted by a drive system indicated generally at 24 located above the guidewires 14 and extending across several rows of posts 12. Drive system 24 is shown in more detail in FIG. 4 and includes a cable 26 entrained about a pair of pulleys 28 disposed at opposite ends of the curtain system. The ends of the cables are secured to a drive drum 30 which is mounted on a rotatable shaft 32 extending in a direction parallel to the rows of posts 12. Several cables 26 are secured to the common drive shaft 32 at the required intervals to ensure smooth deployment of the curtain and the shaft 32 is rotatable by a motor (not shown). Opposite ends of cable 26 are wound in opposite directions about the drive drums 30 so that upon rotation of the shaft 32, one end of the cable 26 will be paid out and the other taken in, causing rectilinear motion of the horizontal run of cable 26 adjacent to the guidewires 14. If preferred, the cables may be attached directly to the shaft 32.

As can be best seen in FIG. 5, the cable 26 is secured to the leading edge of leading portion 20 by means of a clamp 34. Clamp 34 which is shown in more detail in FIGS. 6 and 7 is an aluminum extrusion of generally rectangular section with a pair of overlieing jaws 36 located at one apex. In the free body state, jaws 36 are spaced from one another. A bolt 38 extends through the extrusion and tightening of the bolt 38 causes the jaws 36 to move toward one another. Overlieing jaws 36 are dimensioned to receive the cable 26 and, upon tightening of the bolt 38, grip the cable and ensure that the clamp 34 moves with the cable. Depending from the clamp 34 is a clip 40 having resilient jaws 42 that engage a support tube 44 extending along the leading edge of the leading portion 20. As noted above, the wire loops 18 support the tube 44 on the guide wire 14 and clips 19 engage with the guidewires 14 at regular intervals to provide support for the curtain 16. Supplementary clips 48 are located at spaced intervals along the tube 44 to provide further retention of the portion 20. When the curtain system is to be used outdoors or subject to significant wind forces, jaws 42 may be formed as a loop extending around tube 44 and held closed by bolt 38. This provides a more secure attachment to the tube.

As may also be seen in FIG. 5, the leading edge of trailing portion 22 is similarly supported by a tube 46 with the trailing edge of the portion 20 overlapping the leading edge of the portion 22. Clips 48 hold the portions on the tube 46 and clamps 50 similar to clamps 34 engage the tube 46 through resilient clip 49 and drive cable 26 by jaws 54. Jaws 54 of clamp 50 may be moved toward the closed position by operation of a bolt 52. The clamps 34,50 and support structure for the curtain 16 are conventional components and will not be described in further detail.

The operation of the curtain system 10 will now be described assuming that each curtain portion is fully retracted as shown in FIG. 1. In the arrangement shown in FIG. 1, the clamps 34 are permanently engaged with cable 26. Clamps 50, however, are intended to be selectively engageable with the tube 46 through the resilient clip 49. In order to deploy the leading portion 20 of curtain 16 and provide shade, the tube 46 is released from the clip 49. The driveshaft 32 is rotated by the motor and the cable 26 moved to carry the leading edge along the guidewires 14 toward the opposite row of posts 12. During this deployment, the clamp 50 moves with the cable 26 but does not engage the tube 46 and therefore will not induce movement of the second portion 22 which remains in a retracted configuration as shown in FIG. 1. When fully deployed, the shade portion 20 extends between the adjacent rows of posts 12 to provide shade to the area beneath the curtain. The tube 46 remains supported by the hooks 18 on the wires 14 and the clips 48 retain the portions 20,22 on the tube 46 during this deployment.

In order to deploy the portion 22 and provide frost protection, the shade portion 20 is first retracted to the configuration shown in FIG. 1. The clips 49 are then attached to bring the tube 46 to connect it with the cable 26 and the drive system 24 once again operated. In this case, relative movement between the leading and trailing edges of portion 20 is prohibited due to the action of the pair of clamps 34,50 so that the leading portion 20 moves along the guidewires 14 in the retracted configuration. The trailing portion 22, however, is progressively deployed by movement of the drive cable until it extends between the adjacent rows of posts 12. Once again, movement of the drive system 24 in the opposite direction will cause retraction of the trailing portion 22.

It can be seen, therefore, that in order to deploy the trailing portion 22, it is simply necessary to secure each of the clamps 50 to the tube 46. This may be accomplished in a relatively short time so that the trailing portion 22 which would normally only be deployed on an occasional basis can be brought into operation relatively quickly. For most applications, the leading portion 20 remains operative without any intervention and the infrequently used trailing portion 22 is provided with minimum expense utilizing the common guidewires 14.

It will also be appreciated that the curtain systems shown in FIGS. 1 through 3 could equally be used within a greenhouse environment utilizing existing support structures of the greenhouse rather than the posts 12. The application of conventional curtain systems within greenhouses is well established and it is believed that it is not necessary to describe these in detail in the present application. It will be apparent from the above description that a curtain utilizing a pair of portions of dissimilar material could be accomodated within a greenhouse as in conventional curtain systems and obtain the benefits described above.

The arrangement described above to attach selectively the trailing portion 22 to the drive system utilizes conventional clamps. In FIG. 8, an alternative arrangement is disclosed where a link 60 is pivotally connected on the tube 44 associated with the leading edge of leading portion 20. Link 60 has a hooked end 62 which is engageable with the tube 46 associated with the leading edge of trailing portion 22. In order to obtain deployment of the trailing portion, the link 60 is moved so that the hooked end 62 engages the tube 46 and effectively joins the tubes 44 and 46 together. In this way, the trailing edge is effectively attached to the cable 26 and upon operation of the cable, the trailing portion will be deployed. This arrangement may be quicker to deploy than the clamps 50 and therefore may be attractive where more frequent application of the trailing portion 22 is required.

An alternative arrangement of the two portions of the curtain 16 is shown in FIG. 9 with like components identified by a like reference numeral with suffix 'b' added for clarity. In this arrangement, portion 20b and portion 22b are located on opposite sides of the area to be covered by the curtain. Each is provided with the clamps 34b and 50b as described above so that the edges of the portions 20b,22b remote from the posts 12b can be secured selectively to the cable 26b. In the arrangement shown in FIG. 9, each of the clamps 34b,50b is selectively engageable with the cable 26b and, upon deployment of one of the portions, the clamps associated with the other portion must be released.

Figure 4:
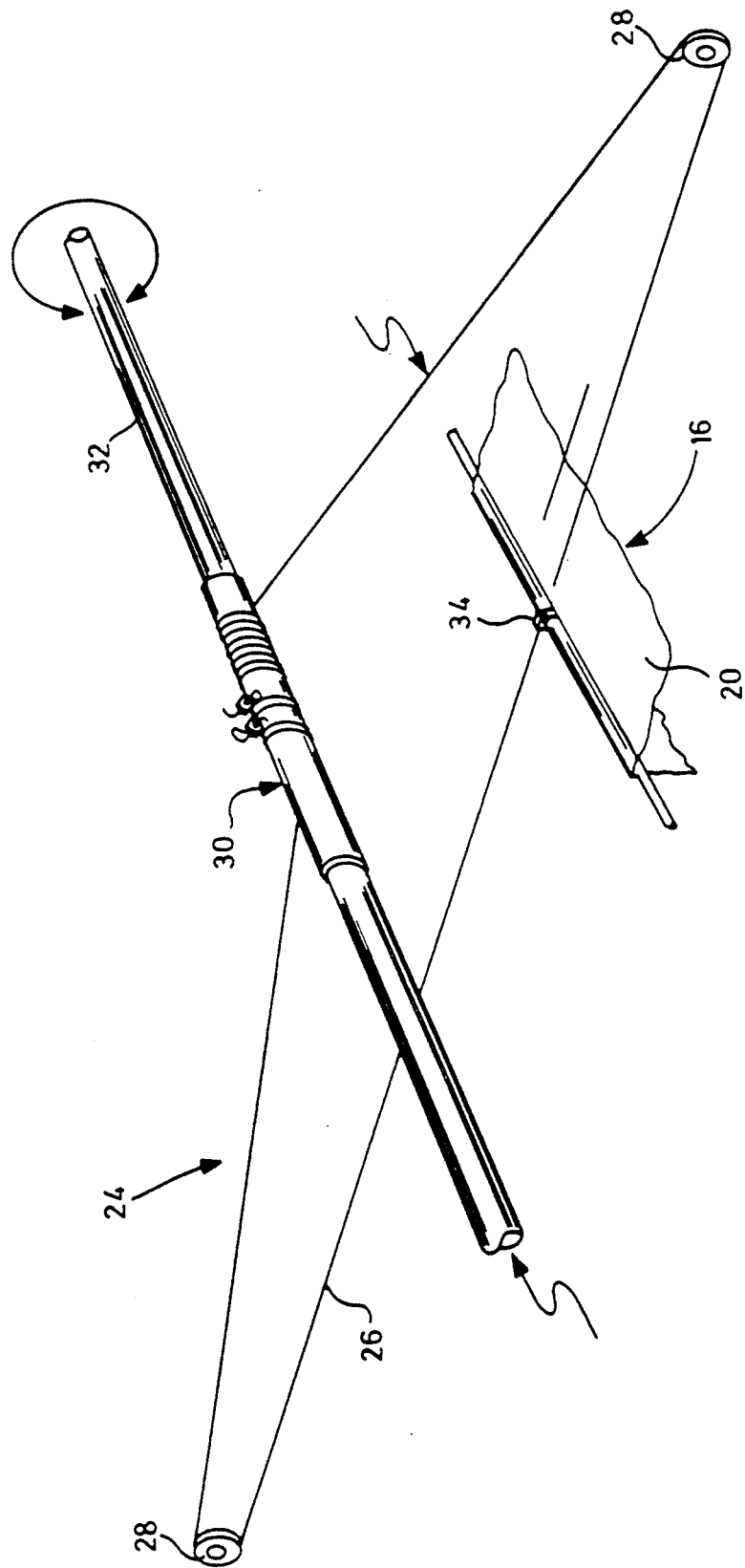
FIG. 4 is a schematic representation of the drive system utilized to deploy the curtain of FIG. 1.

An alternative drive system to that shown in FIG. 4 is illustrated in FIG. 10 where the drive shaft 32a is located on the side of the structure rather than above it as indicated in FIG. 4. In the arrangement in FIG. 10, a pulley 28a is located at the end opposite to the drive shaft 32a and cable 26a entrained about the pulley 28a. A chain 63 passes over a pair of sprockets 64 rotatable about a horizontal axis and about a sprocket 66 secured to the shaft 32a.

This arrangement may be used with either the curtain arrangement shown in FIGS. 1-8 in which case the portions of the curtain would be connected to the same run of cable 26a or with the arrangement shown in FIG. 9 where portion 20b would be attached to are run of the cable and portion 22b to the other run.

It will of course be apparent that alterative drive systems as conventionally used with curtain systems could be utilized providing of course that they permit the selective attachment of one portion of the curtain to the drive cable. In certain applications, rather than utilizing a cable, a reciprocating rod may be used and again provision is made with such an arrangement for selective attachment of one portion of the curtain to the rod for selective deployment.

A further arrangement of curtain is shown in FIG. 11 in which like reference numerals will be used to identify like components with a suffix "c" added for clarity.

In the arrangement of FIG. 11, curtain 16c is supported on guide wires 14c with first and second portions 20c,22c arranged in seriation. To deploy each curtain portion, a drive system 24c is utilized. In contrast to the earlier embodiments, the drive system 24c includes a pair of drive shafts 32c, each associated with a respective one of the portions 20c,22c. Thus portion 20c is deployed by a drive shaft $32c_1$, located at one side of the curtain system 10 and operates on cable $26c_1$, to move the curtain portion 20c. The cable $26c_1$ is entrained about a pulley $28c_1$ at the opposite side of the system 10c so that several of portion 20c may be deployed simultaneously.

Similarly, the portion 22c is deployed by drive shaft $32c_2$ located at the other side of the system 10c by means of cable $26c_2$ passing about pulley $28c_2$.

In operation, therefore, the portion 20c may be deployed by operating drive shaft $32c_1$ which leaves the portion 22c in the retracted condition. Once the portion 20c has been deployed, the portion 22c can be deployed by operating drive shaft $32c_2$ so that portion 22c is extended and at the same time portion 20c is folded. This arrangement requires the portions to be operated sequentially which may be accomplished by suitable interlock controls on the motors but avoids the need for attachment and detachment of one of the portions of the curtain 16c.

The arrangement shown in FIG. 11 has each drive member 32c located at one edge of the curtain system and thus the drive system 24c shown in FIG. 12 is particularly beneficial. A motor support structure 70 is secured relative to the posts 12 and has a pair of threaded blocks 72 mounted to the flanks of the support 70.

A lead screw 74 is attached to the drive shaft 32c for rotation therewith and passes through each of the blocks 72. Rotation of the shaft 32c causes a corresponding rotation of the leadscrew and a longitudinal displacement of each relative to the support 70. The leadscrew 74 is engaged by a transmission 76 that is slidably supported on a guide block 78 on the support. A motor 80 is connected to the transmission 76 to induce rotation of the leadscrew 74.

The pitch of the leadscrew 74 is selected to be equal to the diameter of cable 26c so that as the drive shaft 32c is rotated by the motor 80 to wrap or unwrap the cable 26c, it is also displaced relative to the posts 12 and eliminates lateral movement of the cable.

It will be appreciated that this arrangement is replicated at the opposite edge of the system 10 with the cable runs laterally spaced.

I claim:

1. A curtain system to extend between a pair of horizontally spaced locations and cover a predetermined area, said system having guide means extending between said horizontally spaced locations, a curtain having first and second portions, each having an area equal to or greater than the predetermined area and each supported in seriatim on the guide means for movement along a common longitudinal path, said guide means supporting said curtain at a plurality of transversely spaced locations between opposite longitudinal edges of said curtain and drive means operable to move said portions on said guide means, said drive means being operable selectively on said portions to move one or other of said portions between a retracted configuration and a deployed configuration.

2. A curtain system according to claim 1 wherein said drive means includes a drive member and attachment means to attach each of said portions to said drive member for movement therewith, at least one of the attachment means being selectively operable to disconnect one of said portions from the drive member whereby operation of said drive means moves the other portion between said configurations without changing the configuration of the one portion on said guide means.

3. A curtain system according to claim 1 wherein connection of the one attachment means to said drive member inhibits further change in the configuration of said other portion as said drive means moves said one portion between said configurations.

4. A curtain system according to claim 3 wherein each of said portions is located adjacent one of said spaced locations when each portion is in said retracted configuration.

5. A curtain system according to claim 4 wherein said other portion is located in advance of said one portion on said guide means and said one attachment means is operable to attach a leading edge of said one portion to said drive member.

6. A curtain system according to claim 5 wherein a trailing edge of the other portion is contiguous with said leading edge of said one portion.

7. A curtain system according to claim 6 wherein a leading edge of said other portion is connected to said drive member by said attachment means and remains connected thereto during movement of said one portion between said configurations.

8. A curtain system according to claim 1 wherein each of said portions is located at a different one of said spaced locations when in said retracted configuration.

9. A curtain system according to claim 8 wherein said drive means includes a drive member and attachment means to attach each of said portions to said drive member, each of said attachment means being selectively operable to disconnect respective portions from said drive means.

10. A curtain system according to claim 2 wherein said one attachment means include a clamp moveable between open and closed positions and engageable with said drive member in said closed position.

11. A curtain system according to claim 7 wherein said one attachment means includes a link extending from the leading edge of said other portion to the leading edge of said one portion.

12. A curtain system according to claim 1 wherein said drive means includes a pair of drive members each extending between said spaced locations and moveable in a direction parallel to said common path, each drive member being attached to a respective one of said portions, said drive members being operable independently of one another to permit movement of said portions on said guide means.

13. A curtain system according to claim 11 wherein said drive member is a flexible cable and said one attachment means is selectively engageable with said cable.

14. A curtain system according to claim 13 wherein said one attachment means includes a clamp moveable between open and closed positions and engageable with said cable in said closed position.

* * * * *

UNITED STATES PATENT AND TRADEMARK OFFICE
CERTIFICATE OF CORRECTION

PATENT NO. : 5,265,373
DATED : November 30, 1993
INVENTOR(S) : Richard Vollebregt It is certified that error appears in the above-identified patent and that said Letters Patent is hereby corrected as shown below:

Claim 3, at column 6, line 60, after "claim", delete "1"

and insert --2--.

Signed and Sealed this

Tenth Day of May, 1994

BRUCE LEHMAN

Attest:

Attesting Officer    Commissioner of Patents and Trademarks